United States Patent Office 2,981,752
Patented Apr. 25, 1961

2,981,752

PRODUCTION OF NITROSODIMETHYLAMINE

Arthur W. Campbell, Terre Haute, Ind., assignor to Commercial Solvents Corporation, Terre Haute, Ind., a corporation of Maryland No Drawing. Filed Aug. 1, 1955, Ser. No. 525,813

6 Claims. (Cl. 260—583)

My invention relates to the production of lower nitrosodialkylamines and more particularly, it relates to the production of lower nitrosodialkylamines by reaction of lower dialkylamines and sodium nitrite in the presence of sulfuric acid.

The most widely employed prior process for production of nitrosodialkylamine is described in Organic Syntheses, Collective Volume II, John Wiley and Sons, Inc., New York (1943) at page 211. The prior process consists essentially of reacting dimethylamine and sodium nitrite in the presence of hydrochloric acid to produce nitrosodimethylamine, the reaction mixture being then distilled until the residue is dry. Water is then added to the residue and the process of distillation to dryness repeated. The distillates are combined and saturated with potassium carbonate, the upper layer of nitrosodimethylamine removed and combined with ether extracts of the water layer and the mixture then dried and distilled to obtain nitrosodimethylamine as a yellow oil having a boiling point of about 149–150° at a pressure of 755 mm. of mercury. As is evident, this method is cumbersome and difficult to adapt to large scale commercial preparation of nitrosodimethylamine. Nitrosodialkylamines can be reduced to obtain the corresponding dialkylhydrazine.

I have now discovered an economical and convenient process for production of lower nitrosodialkylamine which new process is direct and capable of producing the desired product in nearly quantitative yields. Lower nitrosodialkylamines which can be produced according to my new process include nitrosodimethylamine, nitrosodiethylamine, nitrosodipropylamine, nitrosodiisopropylamine, nitroso-N-methylisopropylamine, etc.

My new process consists essentially of reacting a compound selected from the group consisting of alkali metal nitrites and alkaline earth metal nitrites with a lower dialkylamine in the presence of sulfuric acid, separating the layers into which the reaction product forms, and removing water from the oily layer thereby obtaining substantially pure nitrosodialkylamine. The theoretical molar ratio of dialkylamine, alkali metal or alkaline earth metal nitrite, and sulfuric acid is one mole of dialkylamine, one mole of alkali metal or alkaline earth metal nitrite and 0.5 mole of sulfuric acid.

The dialkylamine is preferably employed in aqueous solution since the lower dialkylamines have boiling points within the operative range of the temperature of reaction. Obviously, the reaction can be conducted in the presence of an inert solvent and I have found that water is a particularly convenient solvent to employ in my new process. Pure sulfuric acid, for example, is a very difficult material to obtain and handle and as an article of commerce, sulfuric acid is most generally supplied as an aqueous solution. Alkali metal and alkaline earth metal nitrites are, of course, soluble in water.

The reaction can be carried out over a wide range of temperatures; however, I usually employ temperatures ranging from about 20–150° C., although the reaction does not go to completion at temperatures near the lower limit of this range. I prefer to mix the aqueous solution of dialkylamine and sulfuric acid at a temperature of about 20–30° C. Upon addition of alkali metal or alkaline earth metal nitrite, the temperature increases to about 50–60° C. after which I prefer to heat the reaction mixture to a temperature of about 80–100° C. in order to insure that the reaction goes to completion.

Following completion of the reaction, I generally allow the reaction mixture to stand until it separates into two layers, an oily upper layer containing the major part of the product and a lower aqueous layer containing generally about 10% of the product. The nitrosodialkylamine in the upper layer contains some water which can be removed by distillation. The nitrosodialkylamine in the lower aqueous layer and the nitrosodialkylamine removed from the upper layer can be combined and extracted from the aqueous solutions with benzene. The benzene extracts of nitrosodialkylamine from the aqueous mixtures contain some moisture but this moisture is later removed as an azeotrope with benzene when benzene is removed from the nitrosodialkylamine by distillation. Alternatively, ether or other substantially water-immiscible organic solvent for nitrosodialkylamine can be employed to extract the product from the aqueous mixtures. The lower nitrosodialkylamines which have relatively high melting points, such as for example, nitrosodiisopropylamine which has a melting point of about 46° C., can be recovered in nearly pure form by merely cooling the reaction mixture to a temperature below the melting point of the nitrosodialkylamine to precipitate the product in crystalline form.

The following examples are offered to illustrate my invention; however, I do not intend to be limited to the specific proportions, materials, or procedures described. Rather I intend to include within the scope of my invention all equivalents obvious to those skilled in the art.

Example I

A 458-gram portion of a 39.47% aqueous solution of dimethylamine was mixed in a 2 liter flask with 203 grams of 92.3% sulfuric acid, the pH of the mixture being 5.0. The temperature was maintained between 22 and 25° C. To the mixture, 282 grams of solid sodium nitrite was added with vigorous stirring, the mixture warming to 50–60° C. Stirring was continued following addition of sodium nitrite for about two hours with gentle heating to about 90° C. after which the mixture was allowed to stand and cool until layer separation took place. The layers were separated by centrifugation and the upper oily layer amounting to 480 grams containing 59% nitrosodimethylamine then distilled to remove water as an azeotrope with nitrosodimethylamine, the azeotrope consisting of 23% by weight nitrosodimethylamine and 77% by weight water. The lower aqueous layer and the nitrosodimethylamine-water azeotrope were combined and the nitrosodimethylamine extracted from the aqueous mixture with benzene. The benzene was then removed by distillation. The total yield of nitrosodimethylamine was 95.7%.

Example II

A 292-gram portion of diethylamine in 1000 ml. of water was mixed in a two liter flask with 203 grams of 93.2% sulfuric acid. To the mixture, 276 grams of sodium nitrite was added with stirring, the mixture warming to about 70° C. A total of 381 grams of nitrosodiethylamine was recovered by distillation from the reaction mixture.

Example III

A total of 404 grams of diisopropylamine, 1000 ml. of water, 203 grams of 93.2% sulfuric acid, and 276 grams of sodium nitrite were reacted in the manner described in Example II. Following the reaction, the reaction mixture was chilled to precipitate nitrosodiisopropylamine which was filtered and washed to obtain 438 grams of product.

*Example IV*

A total of 292 grams of methylisopropylamine, 1000 ml. of water, 203 grams of sulfuric acid and 273 grams of sodium nitrite were reacted in the same manner as described in Example II. The reaction mixture separated into two layers and 297 grams of nitrosomethylisopropylamine was recovered from the upper layer. Analysis: Calculated—N=27.45%; Found—N=27.40. Boiling point—172.5° C.

Now having described my invention, what I claim is:

1. The process for the preparation of an N-nitroso dilower alkyl amine which comprises reacting in a vigorously stirred aqueous solution about one mole of a dilower alkyl amine, about one mole of sodium nitrite and about one-half mole of sulfuric acid, allowing the reaction mixture to stand until it separates into two layers, removing the upper layer and recovering the N-nitroso dilower alkyl amine from said upper layer.

2. A process for the production of nitrosodialkylamines which comprises reacting in an aqueous medium a dialkylamine having the formula

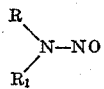

with sodium nitrite in the presence of sulfuric acid at a temperature ranging from about 30 to 150° C., separating the layers which form and removing water from the upper layer to obtain substantially pure nitrosodialkylamine having the structural formula

where R and $R_1$ in the above formulas are alkyl radicals having from 1 to 3 carbon atoms.

3. The process of claim 2 wherein the alkyl radicals are methyl radicals.

4. The process of claim 2 wherein the alkyl radicals are ethyl radicals.

5. The process of claim 2 wherein the alkyl radicals are isopropyl radicals.

6. The process of claim 2 wherein one radical is a methyl radical and the other radical is an isopropyl radical.

References Cited in the file of this patent

UNITED STATES PATENTS

| | | |
|---|---|---|
| 1,643,428 | Tesche et al. | Sept. 27, 1927 |
| 2,419,718 | Kehe | Apr. 29, 1947 |
| 2,627,526 | Du Brow et al. | Feb. 3, 1953 |
| 2,635,116 | Wolfe et al. | Apr. 14, 1953 |
| 2,802,031 | Horvitz | Aug. 6, 1957 |

OTHER REFERENCES

Sidgwick: "Organic Chemistry of Nitrogen" (1937), Oxford University Press, pages 451–453.